June 9, 1931.  C. S. BRAGG ET AL  1,809,014
VACUUM BRAKE MECHANISM
Original Filed June 10, 1926  2 Sheets-Sheet 1
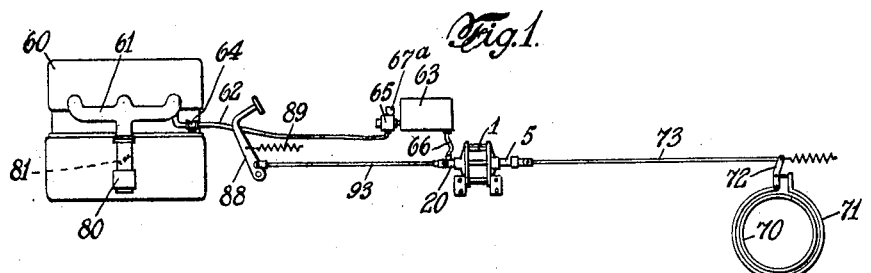
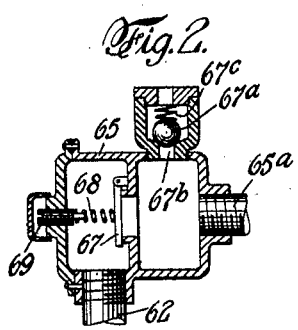
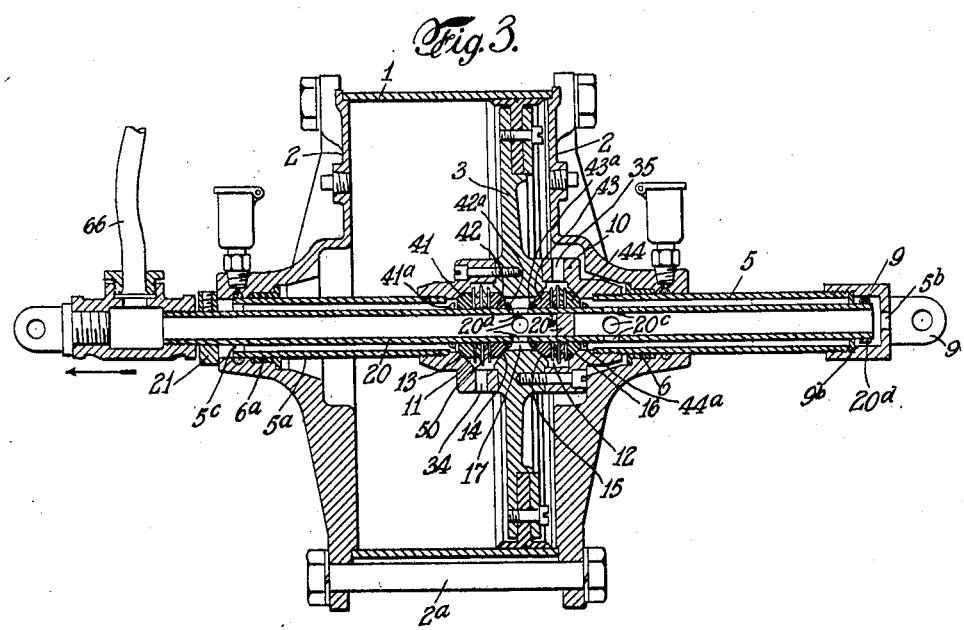

June 9, 1931.   C. S. BRAGG ET AL   1,809,014
VACUUM BRAKE MECHANISM
Original Filed June 10, 1926   2 Sheets-Sheet 2
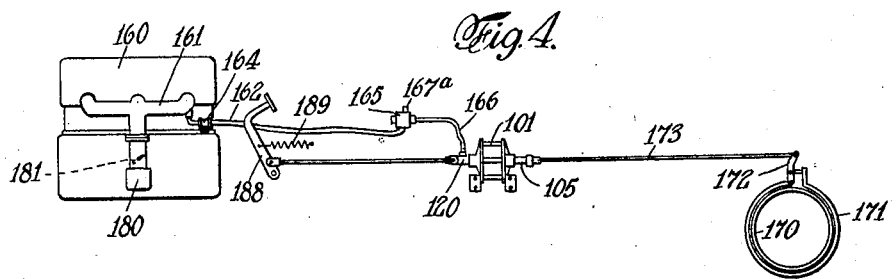
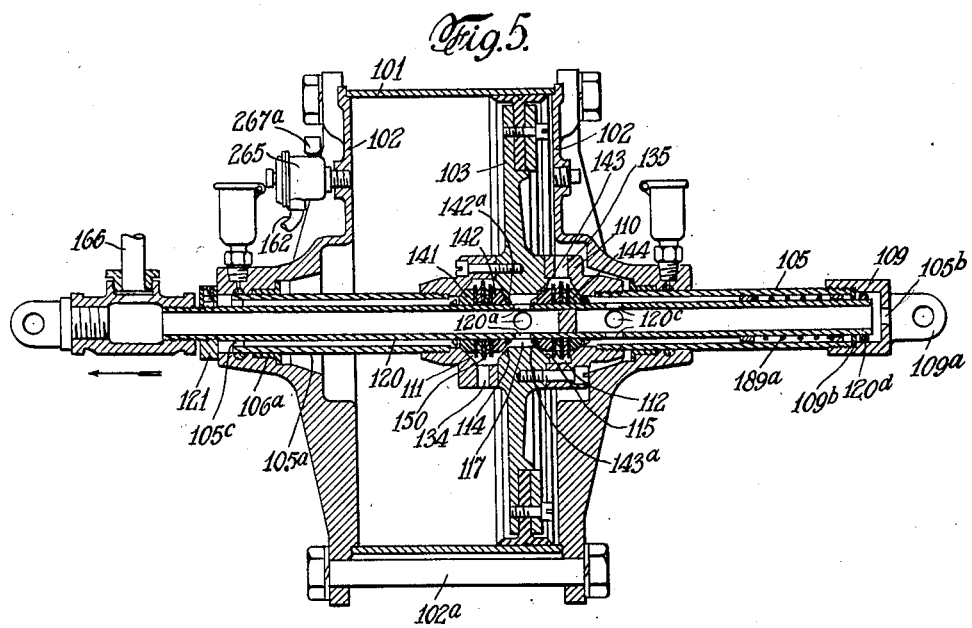

Patented June 9, 1931

1,809,014

UNITED STATES PATENT OFFICE

CALEB S. BRAGG AND VICTOR W. KLIESRATH, OF LONG ISLAND CITY, NEW YORK, N. Y., ASSIGNORS TO BRAGG-KLIESRATH CORPORATION, OF LONG ISLAND CITY, NEW YORK, A CORPORATION OF NEW YORK

VACUUM BRAKE MECHANISM

Application filed June 10, 1926, Serial No. 114,934. Renewed October 17, 1930.

Our invention consists in the novel features hereinafter described, reference being had to the accompanying drawings, which illustrate several embodiments of the same, selected by us for purposes of illustration, and the said invention is fully disclosed in the following description and claim.

Our present invention relates to the installation of a power actuator of the general type illustrated in our prior applications filed December 22, 1923, Serial No. 682,346, and November 22, 1924, Serial No. 751,481, in connection with the brake mechanism or other part to be actuated, of an automotive vehicle, which is ordinarily actuated manually by a hand lever or foot lever, or pedal, or other operator operated device. Such power actuators comprise among their members, a cylinder having a double acting piston therein operated in both directions by establishing differential pressures on opposite faces of the piston and provided with reversing valve mechanism usually located in the piston itself and constructed to maintain the piston in a balanced condition when the valve mechanism is in normal position. The differential pressures necessary for the actuation of these power actuators may be furnished in any usual or preferred manner, but are most conveniently obtained from the internal combustion engine with which the automotive vehicles are ordinarily provided and which in their operation continually provide such differential pressures. For example, the suction passage existing in such an engine between the throttle valve and a cylinder, or cylinders, of the engine, provides a convenient means for obtaining a moderate degree of rarification which may be estimated as a partial vacuum of approximately 20 inches of mercury, and by connecting the valve mechanism with the intake manifold of the engine as the source of low pressure, and with the atmosphere as the source of higher pressure, such power actuators can be very conveniently and economically operated. The engine cylinder also provides a source of higher pressure than atmosphere which may be utilized if desired, in conjunction with atmospheric air as the low pressure fluid, or we may employ both pressure and vacuum if preferred, as set forth in our former application above referred to.

In the installation of these power actuators in automotive vehicles, they are generally inserted directly in the connections between the operator operated device and the part, as the brake mechanism, to be actuated, but they may be installed in other ways. Our invention also includes a connection from the operator operated part to the reversing valve mechanism of the actuator, and a connection between the operator operated part and the part to be actuated, containing a provision for lost motion, whereby the operator operated part may be moved a distance sufficient to actuate the valve mechanism, after which the physical force of the operator may be added to the power of the actuator itself, or may be applied directly to the part to be actuated in case of failure of power, and this is accomplished preferably and usually by connecting the operator operated part directly with the piston of the actuator, by means permitting lost motion.

Our present invention consists particularly in the provision, in the pipe connections, between the source of suction, as the intake manifold and suction storage space, which may be a vacuum tank or the cylinder of the actuator, for example, of a check valve having a spring which normally holds it closed, and which is so constructed and arranged that it will only permit the valve to open after a predetermined degree of rarification has been reached in the intake manifold, and the suction pipe connected therewith. The tension of the spring will hold the check valve closed while the motor is being started, as during such times the rarification in the intake manifold rarely exceeds four inches of mercury even though a self-starter is used, and will not permit any air to be withdrawn from the storage space into the intake manifold, either to dilute the explosive mixture or to decrease the small degree of rarefication therein, upon which the supply of fuel depends, and so prolong the cranking period of the motor, exhausting either the physical strength of the driver, or the storage battery. Our invention also contemplates the employment, in connection with the said spring closed check valve, of a relief valve interposed between the check valve and the cylinder of the actuator, so that in case the piston is positively moved by the operator operated part, when there is no suction available, as for example, when the motor is not running and the cylinder (and tank, if used) are filled with air, any compression on the forward side of the piston will be relieved, so that no retarding effect on the operation of the brake mechanism will be exerted on account of the check valve being held closed by the spring, it being understood that the movement of the foot lever or other operator operated part to take up the lost motion previously referred to, and to enable it to actuate the piston, will have placed the reversing valve mechanism in such position as to vent the cylinder therethrough, except in so far as the spring actuated check valve normally tends to close the suction pipe. Our invention also contemplates certain features of construction and combination of parts hereinafter described and particularly pointed out in the claims.

Referring to the accompanying drawings, in which we have illustrated several forms of our invention, selected by us for purposes of illustration, Fig. 1 is a diagrammatic representation showing one of our power actuators connected with the suction passage of an internal combustion engine of an automotive vehicle, and operatively connected to the brake mechanism thereof, and embodying our present invention, a vacuum storage space in the form of the vacuum tank, being interposed in the suction line.

Fig. 2 is an enlarged sectional view of our improved check valve, which we prefer to use between the suction device and actuator, and showing the relief valve which we prefer to employ in connection therewith.

Fig. 3 is an enlarged sectional view of the actuator itself.

Fig. 4 is a view similar to Fig. 1, of an installation in which the vacuum tank is omitted, and in which the vacuum storage space may be the cylinder of the actuator.

Fig. 5 is an enlarged sectional view of a slightly modified form of actuator in which the suction valves of the reversing valve mechanism are normally held in open position when the piston is in the off position to enable the actuator to serve as a storage tank or space.

In Fig. 1 we have shown diagrammatically, an installation in an automotive vehicle of a power actuator, the piston of which is actuated by atmospheric pressure working against a partial vacuum obtained from the intake manifold of the internal combustion engine, the actuator piston being operatively connected with brake mechanism of the vehicle, the valve actuating part, in this instance a longitudinal sleeve, being operatively connected with a foot lever and also connected with the piston of the actuator by means permitting a sufficient amount of lost motion, to effect the operation of the valve mechanism, after which the foot lever is directly connected with the actuator piston. It will be understood that the particular construction of the power actuator itself, its valve mechanism, and its connections with the brake mechanism, form no part of our present invention, and will not be specifically claimed herein, and will only be described to the extent necessary to enable our present invention to be clearly understood. In this figure, 60, represents the internal combustion engine of an automotive vehicle, provided with the usual suction passage or intake manifold, indicated at 61, supplied with explosive mixture, in the usual manner from the carburetor, indicated at 80, under the special control of the usual throttle valve, indicated at 81, interposed between the carburetor and the engine cylinder. 1, represents the cylinder of the power actuator, which may be of any usual or desired construction, either single or double acting, the piston, 3, of which is provided with a piston rod, 5, preferably hollow, connected with the brake mechanism, or mechanisms, of the vehicle. In this instance we have shown, diagrammatically, a single brake mechanism, indicated by a brake hub, 70, brake band, 71, operating lever, 72, and retracting spring, 74, the said lever, 72, being connected by a link, 73, with the piston rod, 5, of the actuator. The controlling valve mechanism for the actuator is preferably located in the hub of the piston, as indicated in Fig. 3, and is operated by means of a hollow valve actuating sleeve, 20, movable longitudinally connected by a link, 93, with an operator operated part, in this instance a foot lever, 88, provided in this instance with the usual retracting spring, 89. The valve mechanism is connected with the atmosphere and with a source of vacuum obtained in this instance by a connection with the intake manifold, or suction passage of the internal combustion engine. These connections are conveniently made through the hollow sleeve, 20, and we have shown a suction pipe, 62, connected with the intake manifold, 61, and extending to a vacuum tank, 63, which is in turn connected by a flexible pipe, 66, with the longitudinally moving valve actuating sleeve, 20, the pipe, 66, being preferably of greater capacity than the pipe, 62. The suction pipe, 62, is preferably provided with an adjustable restricting, or regulating, valve, indicated at 64, and located adjacent to the intake manifold, and between the intake manifold and the actuator cylinder, and preferably between the manifold and the suction tank, 63, or other storage space. We also provide our improved check valve with a casing, indicated at 65, the check valve itself being indicated at 67, and being provided with a spring, 68, for holding it normally in closed position, with a predetermined pressure, so that the valve will not open until a predetermined degree of rarification has been obtained in the pipe, 62, leading to the intake manifold. This may be accomplished by calibrating the spring to the required pressure, but is conveniently effected by providing the spring, 68, with an adjusting screw, 69, by which the tension of the spring may be adjusted to secure the desired pressure on the check valve, 67, tending to hold it in closed position. We prefer to employ a pivoted flap valve for the check valve, as shown, and to mount it so that it hangs vertically from its pivot when in closed position, but this is not essential. In this instance the check valve casing is secured by a nipple, 65$^a$, to the vacuum storage tank, 63, but it may be supported independently of the tank and connected therewith, and to the pipe, 62. We also provide a relief valve, indicated at 67$^a$, between the check valve, 67, and the actuator. This relief valve may be of any desired form and may be connected at any desired point between the check valve and the actuator. In this instance, as shown in Fig. 2, we find it convenient to attach the relief valve to the casing, 65, of the check valve, on the side of the check valve toward the actuator, and the relief valve, as shown, comprises in this instance a spring actuated ball valve of ordinary construction controlling a relief aperture, 67$^b$, communicating with the interior of the check valve.

In Fig. 3 we have illustrated one form of actuator with which these valves may be employed, the specific construction of which, as before stated, forms no part of our present invention, but which may be briefly described as follows, in order that the operation of our invention may be clearly understood. As illustrated in Fig. 3, the actuator is of the double acting type and comprises the cylinder, 1, closed at both ends by heads, 2, 2, secured by bolts, 2$^a$, or otherwise. 3 is the double acting piston, the hub of which is provided with a hollow piston rod, 5, extending through a stuffing box, 6, in one of the heads, and with a hollow piston rod, 5$^a$, extending through a stuffing box, 6$^a$, in the other head. The hub, 10, of the piston is preferably provided with two valve chambers, 11 and 12, containing oppositely disposed valve seats, 13, 14, 15 and 16, respectively, which are engaged by the oppositely disposed valves, 41, 42, 43 and 44. These valves are preferably made of molded rubber and are provided with central apertures which engages the hollow valve actuating sleeve, 20, which extends through all of the valves, and through the hollow piston rods, and the valves of each pair are normally held seated by yielding retracting devices, 50, interposed between them, the valve sleeve being provided with collars, 41$^a$, 42$^a$, 43$^a$ and 44$^a$, so arranged that a movement of the sleeve, 20, in either direction will open one valve of each pair and will slide freely through the other valve of each pair. The central apertures in the valves are sealed to prevent leakage, and where the valves are made of molded rubber, this is readily accomplished by providing them with central apertures which will fit snugly on the sleeve, 20, so as to form an air tight connection therewith, while permitting longitudinal movement of the valve actuating sleeve therethrough. Between the valve chambers, 11 and 12, the hub of the piston is provided with a suction chamber, indicated at 17, and the valve chamber, 11, is provided with a port, or ports, 34, communicating with the interior of the cylinder on one side of the piston, while the valve chamber, 12, is provided with a port, or ports, 35, communicating with the cylinder on the other side of the piston. The valve sleeve is connected with the suction line by the pipe, 66, as before described, and is provided with apertures, 20$^a$, communicating with the suction chamber. Beyond these apertures the sleeve is provided with a plug or partition, 20$^b$, separating the other end portion of the sleeve from the vacuum chamber and vacuum line. The valves, 42 and 43, on opposite sides of the suction chamber, 17, are the vacuum valves, or suction valves, and the valves, 41 and 44 are the higher pressure inlet valves, which when open, admit air to the cylinder on the side of the piston opposite that which is subjected to suction, or rarification. Thus, air is admitted to the valves, 41 and 44, through the hollow piston rods, the piston rod 5 being provided with an air inlet aperture, indicated at 5$^b$, and the piston rod, 5$^a$, being provided with air inlet apertures, indicated at 5$^c$. The aperture, 5$^b$, may conveniently communicate with the interior of the sleeve, 20, which is provided with apertures, 20$^c$, communicating with the annular space between the sleeve and the piston rod, 5, adjacent to the inlet valve, 44. A limited amount of lost motion between the operator operated part and the piston of the actuator may be provided in any desired manner. In the present instance we have shown the piston rod, 5, provided with a terminal cap or collar, 9, having a lug, 9$^a$, which is connected with the brake mechanism, and this collar contains a recess into which the end of the sleeve, 20, extends, and is provided with a collar, 20$^d$, permitting a limited amount of lost motion between it and the outer end of the said recess in the collar, 9, and an inwardly extending flange, or collar, 9ᵇ, secured to the piston rod, 5, and conveniently held in position by the cap, or collar, 9, which is threaded on the piston rod, or otherwise secured thereto.

From the foregoing, it will be noted that when the valve sleeve is moved in either direction, one of the centrally located suction or low pressure valves, 41 or 42, and one of the air inlet valves, 40 or 43, will be opened simultaneously, thereby placing one end of the cylinder in communication with the suction or low pressure chamber, 17, and the opposite end of the cylinder in communication with the atmosphere, and causing a corresponding movement of the piston in one direction, or the other, according to the direction of movement of the valve actuating sleeve. Conversely, the movement of the valve sleeve in the opposite direction reverses the valve mechanism, and effects the movement of the piston in the opposite direction, while normally all four of the valves are seated and the piston is held stationary. As before stated, the specific construction of the actuator above described, forms no part of our present invention and is not herein specifically claimed.

The object of the check valve herein shown and described is that in starting the internal combustion engine with the throttle practically closed, as is customary, the air would be exhausted from the actuator and storage space and carried into the manifold simultaneously with the mixture from the carburetor, diluting it, or the air would be exhausted from the actuator and storage space before any suction through the carburetor could take place. The result in either case is delay in getting an operative explosive mixture to the cylinders. With this form of check valve, the valve, 67, remains closed when the engine is being cranked, as the degree of rarefication in the intake manifold at cranking speeds of the motor is very low, rarely exceeding four inches of mercury, thus preventing the dilution of the explosive charges into the engine cylinders, and the valve, 67, will not open until after the engine is started, and is operating at sufficient high speed to create normal suction, approximating twenty inches of mercury, in the intake manifold, and thus overcome the resistance of the spring, 68, and open the check valve, after which the air in the suction storage space (as the tank, 63, if used) and connecting pipe and passages to the valve mechanism, will be withdrawn and delivered gradually into the intake manifold under the control of the restricting device, for example, the adjustable regulating valve, 64, as shown in Fig. 1, so as not to interfere with the operation of the engine, or to stall it if idling.

If the foot lever is operated when the engine is not running, and the tank and the cylinder, and the connecting lines in the intake manifold, are at atmospheric pressure, the brake mechanism must be applied by the physical power of the operator. In such case, the forward movement of the piston by the foot lever, which would be accomplished by moving the foot lever forward so as to take up the lost motion between the foot lever and the piston, would make it necessary for the piston to compress any air expelled from the cylinder by its forward movement to the extent necessary to overcome the resistance of the spring, 68, and open check valve, 67. This pressure would have a retarding effect on the operation of the brake mechanism by the physical force of the operator, and would reduce the amount of the physical force of the operator available to apply the brakes. This condition might become worse should a four cylinder motor stop with all inlet valves seated and the throttle valve closed, in which case there would be no escape for the air except the small passage through the closed throttle valve. To prevent this, we employ a normally closed relief valve, 67ᵃ, previousy described, between the actuator and the check valve, and preferably on the tank, 63, or on the body of the check valve, as shown in the drawings, Figs. 1 and 2. This relief valve will be held firmly closed during the normal operations of the apparatus, by the presence of a partial vacuum in the tank, 63, but under the circumstances noted above, any pressure produced in the tank, 63, or connection between the check valve and the actuator, the valve, 67ᵃ, will instantly open, thus venting the cylinder of the actuator and the tank, so that the actuater piston may be freely moved and the full physical force of the operator applied to the brake mechanism. A light spring may be used to keep the relief valve, 67ᵃ, seated, should the valve show the effects of vibrations of the vehicle, or motor, and the tension of the spring, 67ᵃ, is much lighter than that of the spring, 68.

The partial vacuum in the intake manifold at cranking speeds of the motor, when the latter is cranked either manually or by the conventional electric starter, is normally about four inches of mercury, with the throttle closed, which is the most efficient starting position for the conventional types of carburetors in ordinary use, employing the suction actuated idling jet, terminating within the suction passage between the throttle valve and the cylinder, when the throttle is closed. When the motor is started with the throttle open, it is customary, and when the motor is cold, it is practically necessary, to close the choke, which creates substantially the same condition, namely a partial vacuum, ordinarily not exceeding four inches of mercury. Therefore, if the tension is on, or the weight of the check valve prevents its opening until the degree of rarefication in the manifold exceeds approximately five inches of mercury, no air can be withdrawn from the actuator cylinder or storage tank, to dilute or delay the starting mixture at cranking speeds, but as soon as the motor starts, the rarification in the intake manifold, due to the greater number of engine revolutions, increases, and at such times the check valve may open and permit the air to be exhausted from the actuating cylinder or tank, or other suction storage space without materially interfering with the combustible mixture.

Assuming that the check valve is held closed by spring pressure, or by the weight of the valve itself, so that it will not be opened until a partial vacuum in excess of four inches of mercury is obtained in the intake manifold, it would require substantially two pounds of pressure per square inch on the other side of the check valve to open it where the piston is actuated by the physical force of the operator, when the motor is not running, and there is no rarification in the storage space. Assuming the area of the actuator piston to be approximately seventy-five to a hundred square inches, there would build up, in the absence of the relief valve, 67$^a$, a pressure of approximately, from one hundred and fifty to two hundred pounds, to be overcome by the physical force of the operator, were the brakes to be applied by his strength, which force would be diverted from the brakes themselves. This condition is prevented by the relief valve, which permits the operator, under the conditions mentioned, to exert practically all of his physical strength directly upon the brakes.

It is also possible for a four cylinder internal combustion engine to stop in a position where all four of the inlet valves will be closed, and if the throttle valve is closed at the same time, which is its normal position, when the operator's foot is removed from the accelerator, there would be no escape whatever for the air contained within the large area of the cylinder forward of the piston when the brakes have to be applied by the physical force of the operator, if the relief valve, 67$^a$, were not provided.

In Figs. 4 and 5 we have shown the application of our invention in an installation in which the vacuum tank is omitted, and the piston of the power actuator is normally submerged in vacuum, when the engine is running, the cylinder of the actuator providing the desired vacuum storage space to insure the instantaneous operation of the actuator without admitting sufficient quantities of air into the suction passage of the engine to interfere with the operation of the engine, or to stall it if idling. In these figures, the parts corresponding with those previously described and given the same reference numerals, with the addition of 100, the power actuator illustrated in Fig. 5, being constructed exactly like the actuator illustrated in section in Fig. 3, except that when the piston, 103, is in its retracted position, as shown in Fig. 5, and the valve actuating sleeve is in its off position, to which it is retracted either by a spring, 189, secured to the foot lever, 188, or by a spring, 189$^a$, which may be conveniently inserted between the valve actuating sleeve, 120, and the hollow piston rod, 105, the valve actuating sleeve will be arrested, for example, by an adjustable stop collar, 121, on the sleeve, 120, engaging a portion of the adjacent head, 102, of the cylinder, 101, and the actuating collars, 142$^a$ and 143$^a$, are so located as to hold the suction valves, 142 and 143, slightly off of their seats in such position of the apparatus, as to establish a communication between the suction chamber, 117, and the cylinder on both sides of the piston when the parts are in the off, or retracted, position.

When this type of actuator is employed, the suction tank, or vacuum storage tank, can be omitted, and the suction line carried directly to the hollow valve actuating sleeve, 120, which communicates with the suction chamber, 117. In this instance, as shown in Fig. 4, the suction line consists of the suction pipe, 162, one end of which is connected to the intake manifold, 161, of the internal combustion engine, 160, and provided with adjustable regulating or restricting valve, 164, the check valve, indicated at 165, and constructed as shown in Fig. 2, a flexible extension of the suction pipe, indicated at 166, extending from the check valve to the suction connection of the valve actuating sleeve. In this instance the check valve, 165, will be conveniently located on and secured to the chassis or body of the vehicle, and is shown provided with the relief valve, 167$^a$, constructed and operating exactly as the relief valve, 67$^a$, in Fig. 2.

The operation of the apparatus shown in Figs. 4 and 5 will be exactly the same as that previously described, except that when a rarefication exists in the manifold sufficient to effect the opening of the normally closed check valve, the air contained in the cylinder on both sides of the piston will be withdrawn from the actuator and delivered to the intake manifold under the restrictive action of the regulating, or restricting valve, 164, or the suction valves, 142 and 143, may be opened to such a slight extent as to provide restricted passages to prevent the air from being delivered too rapidly to the intake manifold, and in such cases where this is done, the separate restricting valve, 164, could be omitted. This constitutes the cylinder of the actuator as the vacuum or storage space, and obviates the necessity of an extraneous vacuum tank, or other storage space. There is also a slight difference in the operation of the actuator illustrated in detail in Fig. 5, which, however, forms no part of our present invention. Obviously, when the valve actuating sleeve is operated in a direction to apply the brakes, as indicated by the arrow in Fig. 5, the suction valve, 143, will be permitted to close and the suction valve, 142, will be opened to a greater extent, while the air inlet valve, 144, will be opened, thus continuing the action of the cylinder on the forward side of the piston with the suction line and admitting atmospheric air to the cylinder in rear of the piston, and effecting a forward movement of the piston without admitting any appreciable quantity of air to the intake manifold.

Obviously, the relief valve herein described will be normally held seated by the presence of any degree of rarefication within the portion of the suction connection beyond the check valve, and will be opened whenever pressure exists in that portion of the suction connection, or in the cylinder. As a matter of fact, this relief valve could be located on the cylinder forward of the piston, as indicated at 267$^a$, in Fig. 5, in which case the relief valve, 167$^a$, shown in Fig. 4, could be omitted. If a spring is employed for holding the relief valve closed, it will obviously be an extremely light spring intended merely for the purpose of preventing the accidental displacement of the valve from its seat, and would be of much less strength than the spring which holds the check valve in closed position.

What we claim and desire to secure by Letters Patent is:—

The combination with an automotive vehicle, and an internal combustion engine for propelling the same, of a power actuator comprising a cylinder, a piston therein, and controlling valve mechanism therefor, a part to be actuated operatively connected with the actuator piston, an operator operated part connected with the reversing valve mechanism, a suction connection from the suction passage of the engine to the actuator cylinder, a check valve in said connection, a spring constructed to hold said check valve closed when the engine is operated at lower revolutions than operative running speed, to prevent the introduction of air into the suction passage of the engine from the portions of the suction connection beyond said check valve while starting the engine, operative connections between the operator operated part and the piston and the part to be operated thereby, and a normally closed relief valve for the cylinder and that portion of the suction connection between the check valve and the cylinder provided with a retracting spring of less strength than the check valve spring, permitting the relief valve to open readily whenever pressure accumulates in the cylinder forward of the piston.

In testimony whereof we affix our signatures.

CALEB S. BRAGG.
VICTOR W. KLIESRATH.